(12) United States Patent
Perrot

(10) Patent No.: US 6,769,853 B2
(45) Date of Patent: Aug. 3, 2004

(54) HOLDING DEVICE FOR FIXING A CAR BODY ELEMENT TO THE STRUCTURE OF A MOTOR VEHICLE

(75) Inventor: Philippe Perrot, Montbeliard (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 0 days.

(21) Appl. No.: 10/240,765

(22) PCT Filed: Feb. 13, 2002

(86) PCT No.: PCT/FR02/00555

§ 371 (c)(1),
(2), (4) Date: Oct. 15, 2002

(87) PCT Pub. No.: WO02/066846

PCT Pub. Date: Aug. 29, 2002

(65) Prior Publication Data

US 2003/0077144 A1 Apr. 24, 2003

(30) Foreign Application Priority Data

Feb. 16, 2001 (FR) .......................................... 01 02181

(51) Int. Cl.[7] .......................... F16B 21/00; B60R 27/00
(52) U.S. Cl. .......................... 411/553; 411/2; 411/508; 296/191; 296/198
(58) Field of Search .......................... 411/2, 104, 349, 411/549, 553, 508; 296/191, 198

(56) References Cited

U.S. PATENT DOCUMENTS

| 2,504,358 | A | * | 4/1950 | Swanson | 411/549 |
|---|---|---|---|---|---|
| 2,555,291 | A | * | 5/1951 | Poupitch | 411/549 |
| 3,407,454 | A | * | 10/1968 | Myatt | 411/549 |
| 4,007,516 | A |  | 2/1977 | Coules |  |
| 4,529,244 | A | * | 7/1985 | Zaydel | 296/191 |
| 4,653,970 | A |  | 3/1987 | Ballantyne |  |
| 5,011,356 | A |  | 4/1991 | Fernandez |  |
| 5,098,765 | A | * | 3/1992 | Bien | 428/134 |
| 5,368,427 | A |  | 11/1994 | Pfaffinger |  |
| 5,605,353 | A | * | 2/1997 | Moss et al. | 280/784 |
| 6,146,071 | A | * | 11/2000 | Norkus et al. | 411/104 |

* cited by examiner

*Primary Examiner*—Flemming Saether
(74) *Attorney, Agent, or Firm*—Westerman, Hattori, Daniels & Adrian, LLP

(57) ABSTRACT

The invention relates to a holding device for fixing a car body element to the structure of a motor vehicle. The inventive device is of the type that comprises a panel (10) formed by a sheet (11) which defines a support face that is adapted to co-operate with the car body clement and,which comprises means (14, 15) for locking to the car body clement and frangible means (16) for releasing the car body element. Said device also comprises an element (30) for quarter-turn fixing in an opening in the structure which is used to hold the assembly formed by the panel (10) and the car body element.

20 Claims, 5 Drawing Sheets

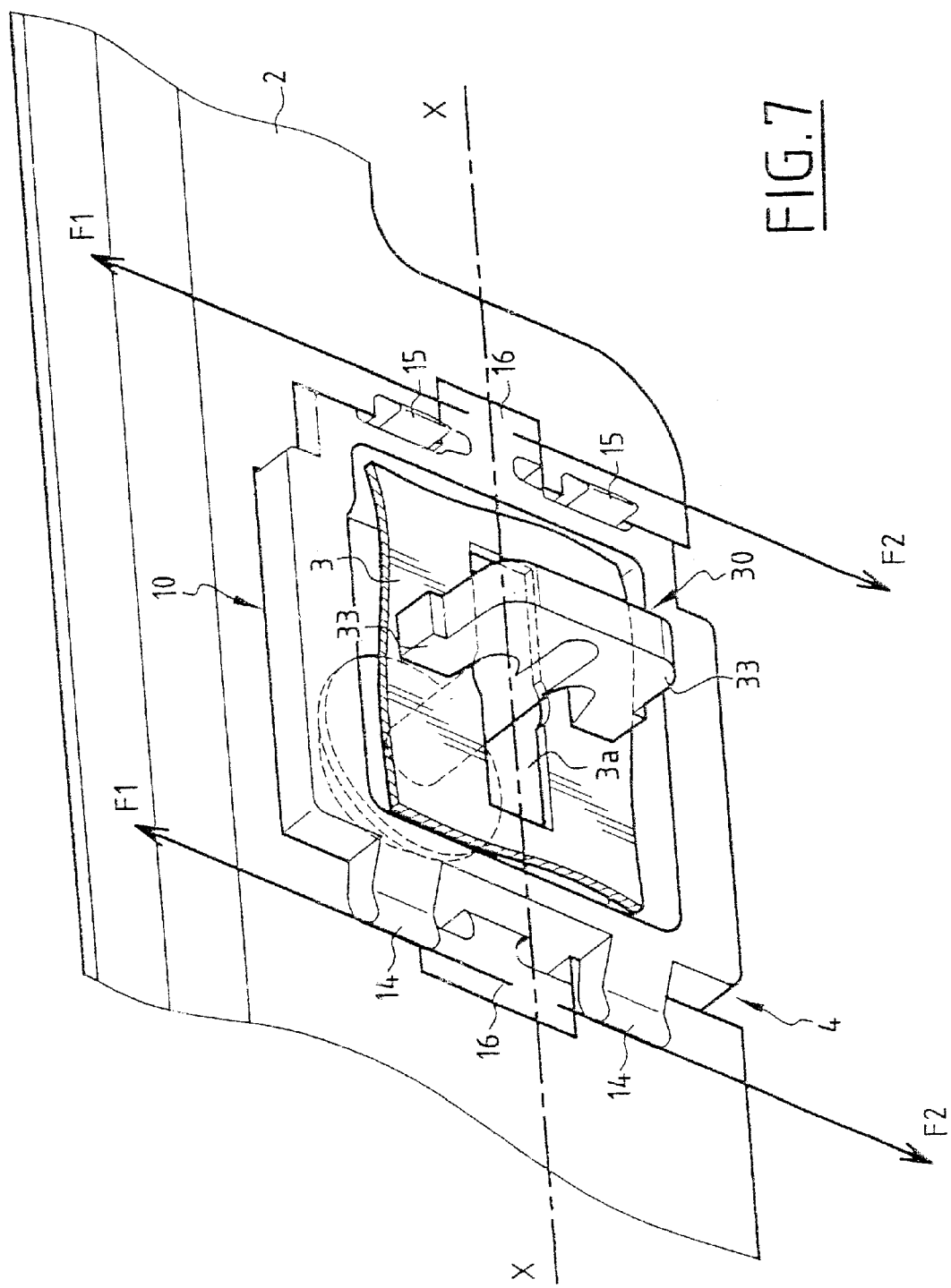

HOLDING DEVICE FOR FIXING A CAR BODY ELEMENT TO THE STRUCTURE OF A MOTOR VEHICLE

BACKGROUND OF THE INVENTION

The present invention relates to a clip for securing a bodywork element, such as a fender for example, to the structure of a motor vehicle.

At the present time, there are, in the motor industry, numerous techniques designed for joining two parts together, for example screwing, bonding or the use of clips.

Screw-fastening techniques involve a lengthy assembly time and detract from the appearance of the assembly as the screws are visible and liable to corrosive attack.

Assembly techniques employing bonding have the disadvantage of producing a permanent assembly, it no longer being possible for the two parts to be separated subsequently. In addition, burring phenomena may occur and these techniques of assembly by bonding also entail a not insignificant curing time.

To alleviate these disadvantages, motor vehicle manufacturers use, for securing bodywork elements, such as fenders, for example, to the structure of the motor vehicle, clips which can be built into one of the two parts that are to be assembled or attached to them before they are mounted.

In general, the clips used hitherto comprise a head which is fixed to the fender and an elastically deformable part connected to this head and which is intended to collaborate in snap-fastening with an opening made in the structure of the motor vehicle.

However, motor vehicle manufacturers have an increasing tendency to use so-called "shape memory" fenders for the front fenders of vehicles, which fenders are, for example, made of plastic and can undergo significant deformation under the action of mechanical and/or thermal stresses and then return to their initial shape without damage when these stresses cease.

Now, the clips currently employed do not allow the fender to undergo deformation under the action of thermal and/or mechanical stresses and, in particular, in the case of low-speed impacts, that is to say impacts at below 16 km/h, which means that it is almost invariably necessary to replace it.

In addition, the movement of the fender, particularly in the case of a plastic fender, becomes necessary given the thermal stresses to which the vehicle is subjected, particularly as the bodywork passes through the paint station after the "cataphoresis" bake at the paintworks, without residual deformation when it returns to ambient temperature.

SUMMARY OF THE INVENTION

It is therefore an object of the invention to provide a clip for securing a bodywork element, such as a fender, for example, to the structure of the vehicle which allows simple, quick assembly and which allows this bodywork element to deform under the action of mechanical and/or thermal stresses.

The subject of the invention is therefore a clip for securing a bodywork element, such as a fender for example, to the structure of a motor vehicle, characterized in that it comprises:

a mounting plate formed by a plate delimiting a bearing face designed to collaborate with the bodywork element and comprising, on this bearing face, on the one hand, means of snap-fastening to the bodywork element and, on the other hand, frangible means for releasing the bodywork element from the structure of the vehicle when a determined transverse stress is applied to the bodywork element, and a quarter-turn fastener which fits into a slot made in the structure to hold the assembly formed by; the mounting plate and the bodywork element, said bodywork element being movable in a direction parallel to the longitudinal axis of the vehicle.

According to other particular embodiments of the invention:

the means of snap-fastening to the bodywork element are formed of at least one horizontal tab formed on a lateral edge of a frame formed under the plate and running parallel to the bearing face of said plate and of at least one vertical tab arranged on the other lateral edge of the frame and elastically deformable in a direction parallel to the longitudinal axis of the motor vehicle, the frame has a shape that is the mate of a cutout made in the bodywork element, the cutout of the bodywork element has the shape of a U and the frangible means comprise two opposed tongues each formed on one lateral edge of the frame of the plate, each tongue having the shape of a T and being intended to collaborate with a notch formed on an edge of said cutout, the quarter-turn fastener is formed of a shank comprising, at one of its ends, a head and, at the other of said ends, two opposed branches curved toward said head, the fastener can be turned between, on the one hand, a position for being introduced in turn into a slot made on the mounting plate and into the slot of the structure, in which position the branches of the shank are parallel to the longitudinal axis of the vehicle and, on the other hand, a position of locking on the structure, in which position the branches of the shank are perpendicular to said longitudinal axis of the vehicle, the branches of the fastener are elastically deformable in bending with respect to a plane passing through the shank of said fastener, the distance between the free ends of the two branches of the fastener is shorter than the length of each slot, the distance between the free ends of the branches of the fastener is greater than the width of each slot.

Another subject of the invention is an assembly of a bodywork element such as a fender, for example, with the structure of a motor vehicle, characterized in that that is it achieved by means of at least one securing clip as mentioned hereinabove.

BRIEF DESCRIPTION OF THE DRAWINGS

Other features and advantages of the invention will become apparent from reading the description which will follow, given by way of example and with reference to the appended drawings, in which:

FIGS. 6 and 7 are schematic perspective views showing the successive steps in mounting the clip in a slot made in the structure of the motor vehicle.

DESCRIPTION OF PARTICULAR EMBODIMENTS

Figure 1:
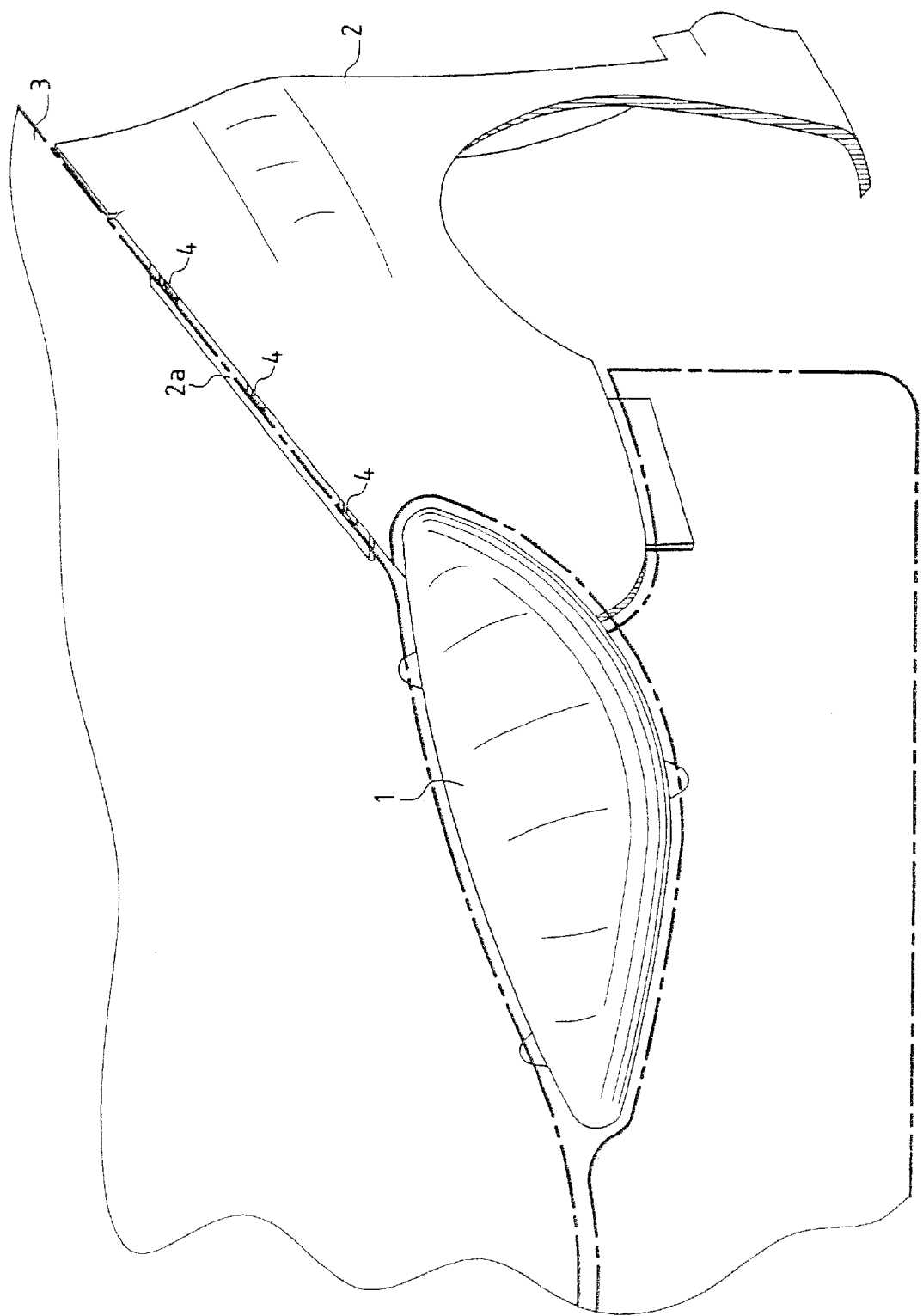
FIG. 1 is a schematic perspective view of a lighting unit and front fender mounted on the structure of a motor vehicle using securing clips according to the invention.

FIG. 1 schematically depicts a lighting unit 1 and a bodywork element 2 consisting of a front fender of a motor vehicle. The lighting unit 1 is mounted on, the structure of the vehicle by appropriate means, not depicted.

Motor vehicle manufacturers are making increasing use of so-called "shape memory" front fenders, such as plastic front fenders for example, which may; undergo significant deformation under the action of mechanical and/or thermal stresses then revert to their initial shape without deterioration when these stresses cease.

In the exemplary embodiment depicted in FIG. 1, the fender 2 comprises, at its upper part, a rim 2a intended to be fixed by clips according to the invention to the structure 3 formed, for example, of a cabin-side front reinforcement or the front upper half-facade of the motor vehicle.

Figure 2:
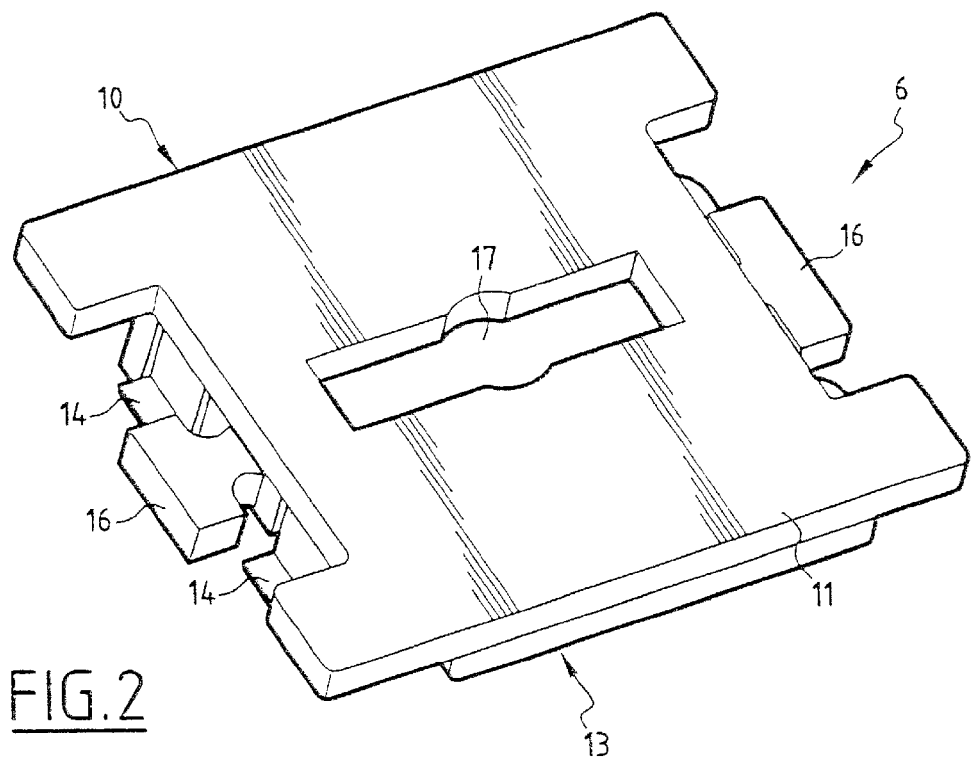
FIGS. 2 and 3 are perspective views from above and below respectively of a mounting plate of the securing clip according to the invention.
Figure 3:
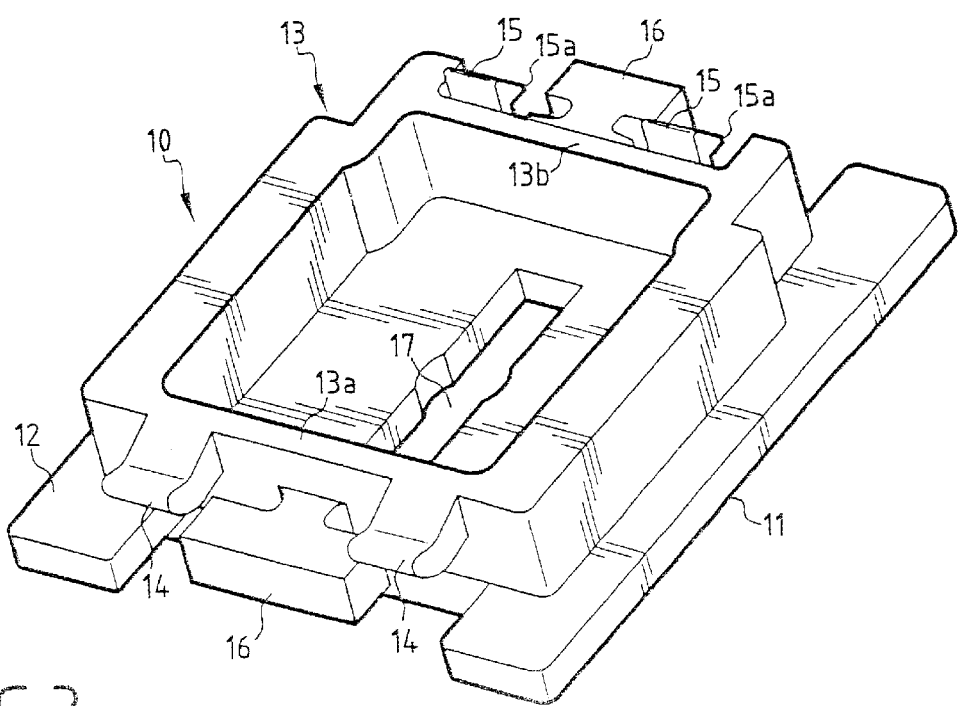
Figure 4:
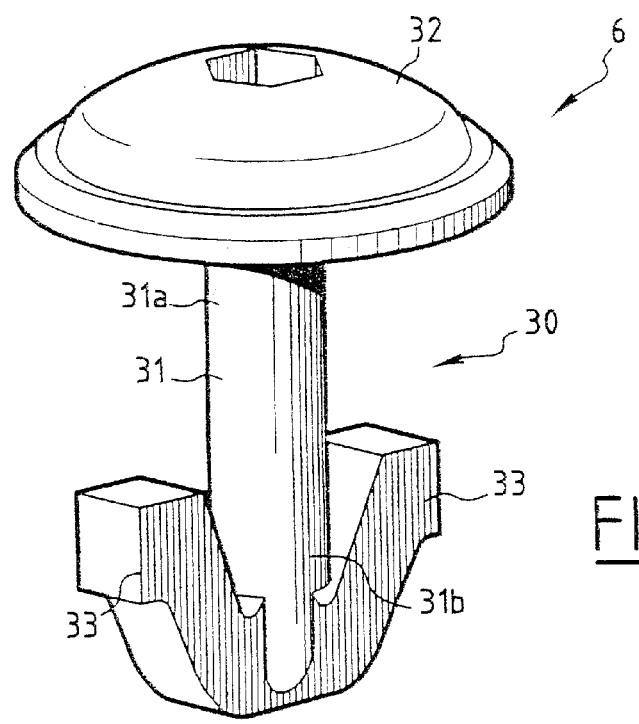
FIG. 4 is a perspective view of a quarter-turn fastener of the securing clip according to the invention.

As depicted in FIGS. 2 to 4, the securing clip denoted in its entirety by the reference 6 is made up of two elements, a mounting plate 10 and a quarter-turn fastener 30 for fastening to the structure 3 of the motor vehicle.

The mounting plate 10 will be described first of all, with reference to FIGS. 2 and 3.

This mounting plate 10 is formed of a plate 11 of rectangular overall shape delimiting a bearing face 12 designed to collaborate with the bodywork element 2, that is to say with the fender.

The plate 11 comprises, on its bearing face 12, on the one hand, means of snap-fastening onto the bodywork element 2 and, on the other hand, frangible means of releasing the bodywork element 2 from the structure 3, of the vehicle when a determined transverse stress is applied to the bodywork element 2.

Figure 5:
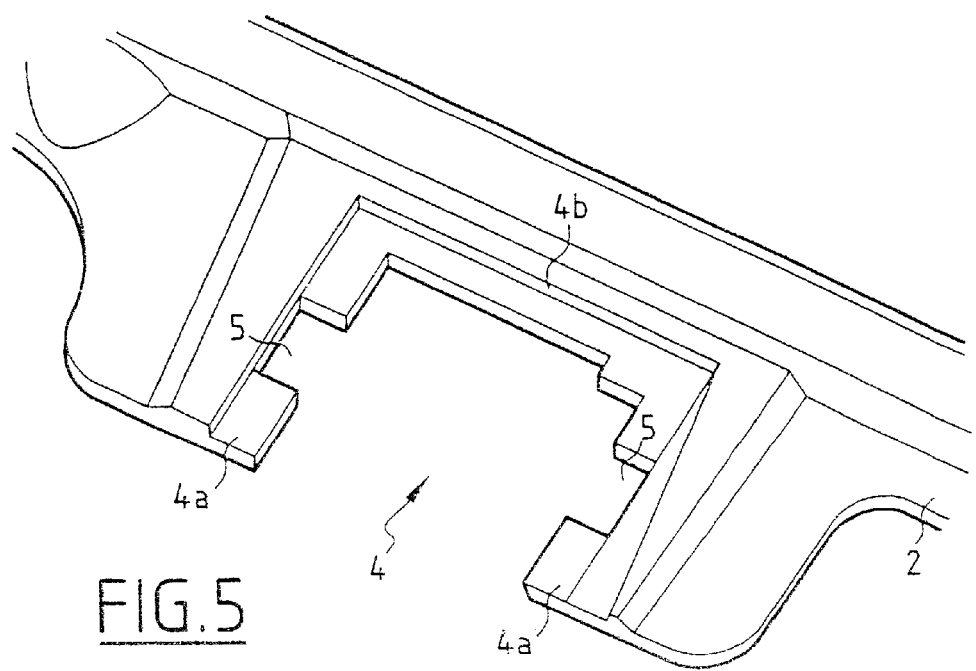
FIG. 5 is a perspective view of a cutout made in the fender for the securing clip.

In addition, the mounting plate 10 comprises, on the bearing face 12 of the plate 11, a frame 13 which has an overall shape that is the mate of a cutout 4 formed in the bodywork element 2, as depicted in FIG. 5.

The means of snap-fastening the mounting plate 10 into the cutout 4 of the bodywork element 2 are formed of at least one horizontal tab 14 formed on a lateral edge 13a of the frame 13 and running parallel to the bearing face 12 and of at least one vertical tab 15 arranged on the other lateral edge 13b of the frame 13 and elastically deformable in a direction parallel to the longitudinal axis of the motor vehicle.

As a preference, the snap-fastening means are formed of two horizontal tabs 14 and two vertical tabs 15.

Each vertical tab 15 comprises, at its free end, a rim 15a for catching on one of the edges 4a of the cutout 4.

The frangible means of releasing the bodywork element 2 from the structure 3 of the vehicle when a determined stress is applied to this bodywork element 2 are formed of two opposed tongues 16 each formed on one of the lateral edges 13a and 13b of the frame 13 of the plate 11, the base of the T of each tongue 16 constituting a portion of lesser strength.

As depicted in FIGS. 2 and 3, each tongue 16 has the shape of a T and is intended to be placed in a notch 5 made on an edge of the cutout 4 when the mounting plate 10 is mounted in this cutout 4.

As depicted in FIG. 5, the cutout 4 made in the bodywork element 2 has the shape of a U which allows this bodywork element 2 to become detached from the clips when the tongues 16 break, as will be seen later on.

Finally, plate 11 of the mounting plate 10 comprises a slot 17 which, once the mounting plate 10 has been mounted in the corresponding cutout 4, runs parallel to the longitudinal axis of the motor vehicle.

The fastener 30 will now be described with reference to FIG. 4.

This fastener 30 is formed of a shank 31 of, for example, circular cross section comprising, at its end 31a, a head 32 and, at its end 31b, two opposed branches 33 curved toward said head 32 and which form a ship's anchor.

The shape of the head 32 of the shank 31 is determined to collaborate with a tool for turning the fastener 30 through a quarter of a turn once it has been mounted. For this, the head 32 may have a slot for a screwdriver or may have a hollow hexagonal shape or a hexagonal external shape to collaborate with a key, wrench or spanner of appropriate shape.

Figure 6:
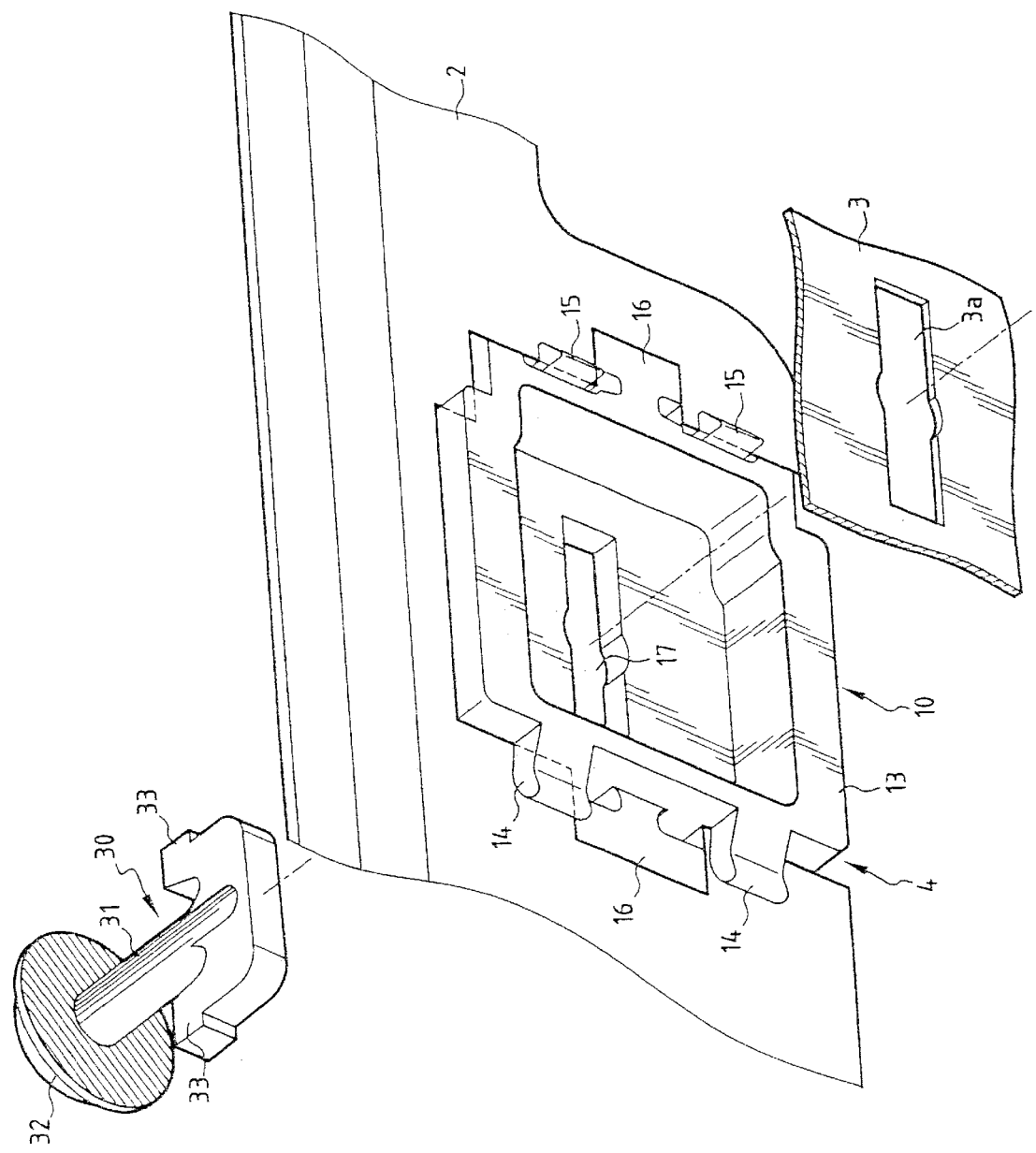

As depicted in FIG. 6, the part of the structure 3 of the vehicle intended to receive the bodywork element 2 comprises at least one slot 3a for the securing of this bodywork element 2.

The distance between the free ends of the branches 33 of the fastener 30 is shorter than the length of the slot 17 of the mounting plate 10 and than the length of the slot 3a of the structure 3. In addition, the distance between the free ends of these branches 33 is greater than the width of each slot 3a and 17.

The elements that make up the clip 6, that is to say the mounting plate 10 and the fastener 30, are made of plastic for the flexibility of the branches 33 of this fastener 30, and for good positioning of the tongues 16 of this mounting plate 10.

The securing clip 6 is mounted on the bodywork element 2 as follows:

For example, the rim 2a of this bodywork element 2 has three cutouts 4 of shapes that complement those of the mounting plates of the clips 6 and each cutout 4 has a mounting plate 10 mounted under slight stress at the frangible tongues 16.

As depicted in FIG. 6, at the time of mounting of the mounting plate 10 in the corresponding cutout 4, the horizontal tongues 14 are placed under one of the edges 4a of this cutout 4 and then each vertical tab 15 is snap-fastened over the opposite edge 4a, which holds the mounting plate in place on the bodywork element 2. Each frangible tongue 16, is placed in a notch 5 formed on an edge of the cutout 4.

The bodywork element 2 thus equipped with the mounting plates 10 in the care of the supplier and before being assembled onto the body of the vehicle at the factory is then transported to the place of assembly and placed on the structure 3, positioning the slot 17 of each mounting plate 10 opposite a slot 3a of said structure 3.

Next, a fastener 30 is mounted in each mounting plate 10, introducing the branches 33 of the shank 31 successively into the slot 17 of the mounting plate 10 and into the slot 3a of the structure 3 go as to press the head 32 of this shank 31 against the plate 11 of the said mounting plate 10. In this position, the branches 33 run parallel to the longitudinal axis X of the motor vehicle.

Following this first operation, the fastener 30 is turned by a quarter of a turn using an appropriate tool collaborating with the head 32 so as to place the branches 33 of the shank 31 at right angles to the longitudinal axis X of the motor vehicle. In this position, the free ends of the branches 33 bear against the underside of the sheet of the structure 3 and this locks the bodywork element 2 to said structure 3.

As the fastener is turned, the sliding of the free ends of the branches 33 along the sheet of the structure 3 occurs through deformation, then relaxation of these branches 33 which, adjust in terms of tension to the thickness of the sheets at the location of the clip 6.

The variations in temperature cause expansion or contraction phenomena in the bodywork element 2, particularly when it is made of a material sensitive to these temperature variations.

The assembly consisting of the bodywork element 2 and the clips 6 each formed of a mounting plate and of a fastener 30 which are mounted in a longitudinal slot 3a of the structure 3 allows this assembly to move in a direction parallel to the, longitudinal axis X of the vehicle, as depicted in FIG. 7.

In addition, in the event of a frontal impact, the assembly consisting of the bodywork element 2 and the clips 6 is stressed in a direction at right angles to the longitudinal axis X of the vehicle, for example, by the pivoting of the headlamp 1. The force F1 exerted by the bodywork element on the clips 6 at the time of this impact leads to a resultant force F2 exerted through these clips 6 on the bodywork element and, above a certain stress value, causes the frangible tongues 16 to shear.

The shearing of these frangible tongues 16 detaches the bodywork element 2 from the mounting plates 10 and this bodywork element is freed from the structure without damage. It is refitted simply by replacing the securing clips.

The securing clip according to the invention has the advantage of being robust and allows a bodywork element to be mounted simply and quickly on the structure of the vehicle and allows a significant reduction in the assembly time and the cost.

In addition, the securing clip according to the invention allows the bodywork element to deform under the action of mechanical and/or thermal stresses, thus making it possible for a shape memory material to be used for this bodywork element.

What is claimed is:

1. A clip for securing a bodywork element to the structure of a motor vehicle, comprising:
    a mounting plate formed by a plate having a bearing face adapted to cooperate with the bodywork element, said mounting plate comprising means for snap-fastening to the bodywork elements in a first direction and frangible means for releasing the bodywork element from the structure of the vehicle when a predetermined stress transverse to said first direction is applied to the bodywork element, and
    a quarter turn fastener which fits into a slot made in the structure to hold the assembly formed by the mounting plate and the bodywork element, such that said bodywork element is movable in a direction parallel to the longitudinal axis of the vehicle.

2. The securing clip as claimed in claim 1, wherein the means for snap-fastening to the bodywork element are formed by at least one horizontal tab formed on a lateral edge of a frame formed under the plate and running parallel to the bearing face of said plate and by at least one vertical tab arranged on the other lateral edge of the frame and elastically deformable in a direction parallel to the longitudinal axis of the motor vehicle.

3. The securing clip as claimed in claim 2, wherein the quarter-turn fastener is formed of a shank comprising, at one of its ends, a head and, at the other of said ends, two opposed branches curved toward said head.

4. The securing clip as claimed in claim 3, wherein the fastener can be turned between, on the one hand, a position for being introduced in turn into a slot made on the mounting plate and into the slot of the structure, in which position the branches of the shank are parallel to the longitudinal axis of the vehicle and, on the other hand, a position of locking on the structure, in which position the branches of the shank are perpendicular to said longitudinal axis of the vehicle.

5. The securing clip as claimed in claim 3, wherein the branches of the fastener are elastically deformable in bending with respect to a plane passing through the shank of said fastener.

6. The securing clip as claimed in claim 2, wherein the frame has a shape that is the mate of a cutout made in the bodywork element.

7. The securing clip as claimed in claim 6, wherein the quarter-turn fastener is formed of a shank comprising, at one of its ends, a head and, at the other of said ends, two opposed branches curved toward said head.

8. The securing clip as claimed in claim 7, wherein the fastener can be turned between, on the one hand a position for being introduced in turn into a slot made on the mounting plate and into the slot of the structure, in which position the branches of the shank are parallel to the longitudinal axis of the vehicle and, on the other hand, a position of locking on the structure, in which position the branches of the shank are perpendicular to said longitudinal axis of the vehicle.

9. The securing clip as claimed in claim 7, wherein the branches of the fastener are elastically deformable in bending with respect to a plane passing through the shank of said fastener.

10. The securing clip as claimed in claim 6, wherein the cutout of the bodywork element has the shape of a U and the frangible means comprise two opposed tongues each formed on one lateral edge of the frame of the plate, each tongue having the shape of a T and being intended to collaborate with a notch formed on an edge of said cutout.

11. The securing clip as claimed in claim 10, wherein the quarter-turn fastener is formed of a shank comprising, at one of its ends, a head and, at the other of said ends, two opposed branches curved toward said head.

12. The securing clip as claimed in claim 11, wherein the fastener can be turned between, on the one hand, a position for being introduced in turn into a slot made on the mounting plate and into the slot of the structure, in which position the branches of the shank are parallel to the longitudinal axis of the vehicle and, on the other hand, a position of locking on the structure, in which position the branches of the shank are perpendicular to said longitudinal axis of the vehicle.

13. The securing clip as claimed in claim 11, wherein the branches of the fastener are elastically deformable in bending with respect to a plane passing through the shank of said fastener.

14. The securing clip as claimed in claim 1, wherein the quarter-turn fastener is formed of a shank comprising, at one of its ends, a head and, at the other of said ends, two opposed branches curved toward said head.

15. The securing clip as claimed in claim 14, wherein the fastener can be turned between, on the one hand, a position for being introduced in turn into a slot made on the mounting plate and into the slot of the structure, in which position the branches of the shank are parallel to the longitudinal axis of the vehicle and, on the other hand, a position of locking on the structure, in which position the branches of the shank are perpendicular to said longitudinal axis of the vehicle.

16. The securing clip as claimed in claim 14, wherein the branches of the fastener are elastically deformable in bending with respect to a plane passing through the shank of said fastener.

17. The securing clip as claimed in claim 14, wherein the distance between the free ends of the branches of the fastener is shorter than the length of each slot.

18. The securing clip as claimed in claim 14, wherein the distance between the free ends of the branches of the fastener is greater than the width of each slot.

19. An assembly of a bodywork element and the structure of a motor vehicle, achieved by means of at least one securing clip as claimed in claim.

20. Motor vehicle comprising an assembly of a bodywork element and the structure of the motor vehicle achieved by means of at least one securing clip as claimed in claim 1.

* * * * *